United States Patent
Gershinsky et al.

(10) Patent No.: US 8,145,786 B2
(45) Date of Patent: Mar. 27, 2012

(54) EFFICIENT BUFFER UTILIZATION IN A COMPUTER NETWORK-BASED MESSAGING SYSTEM

(75) Inventors: Gidon Gershinsky, Haifa (IL); Konstantin Shagin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 12/245,779

(22) Filed: Oct. 6, 2008

(65) Prior Publication Data

US 2010/0088424 A1    Apr. 8, 2010

(51) Int. Cl.
*G06F 15/16* (2006.01)
*G06F 13/12* (2006.01)
*G06F 13/00* (2006.01)
(52) U.S. Cl. ............... 709/234; 710/52; 711/3; 711/118
(58) Field of Classification Search .................. 709/234; 710/52; 711/3, 118
See application file for complete search history.

(56) References Cited

U.S. PATENT DOCUMENTS

| 5,136,582 A * | 8/1992 | Firoozmand .................. 370/400 |
| 6,788,697 B1 * | 9/2004 | Aweya et al. .................. 370/412 |
| 2003/0061417 A1 | 3/2003 | Craddock et al. |
| 2005/0262215 A1 | 11/2005 | Kirov et al. |

* cited by examiner

*Primary Examiner* — Philip Chea
(74) *Attorney, Agent, or Firm* — Dan Swirsky

(57) ABSTRACT

Buffering messages by receiving a message from a messaging client, writing the message to a logically-contiguous write-available region of a message buffer starting at a logically next write-available location within the write-available region, updating a head index to indicate a head boundary between a logically last message in the message buffer and a logically next write-available location in the message buffer, defining a packet including the message within the message buffer, transmitting a packet that includes a logically first message in the message buffer, and updating a tail index to indicate a tail boundary between a new logically last write-available location in the message buffer and a new logically first message in the message buffer.

8 Claims, 11 Drawing Sheets

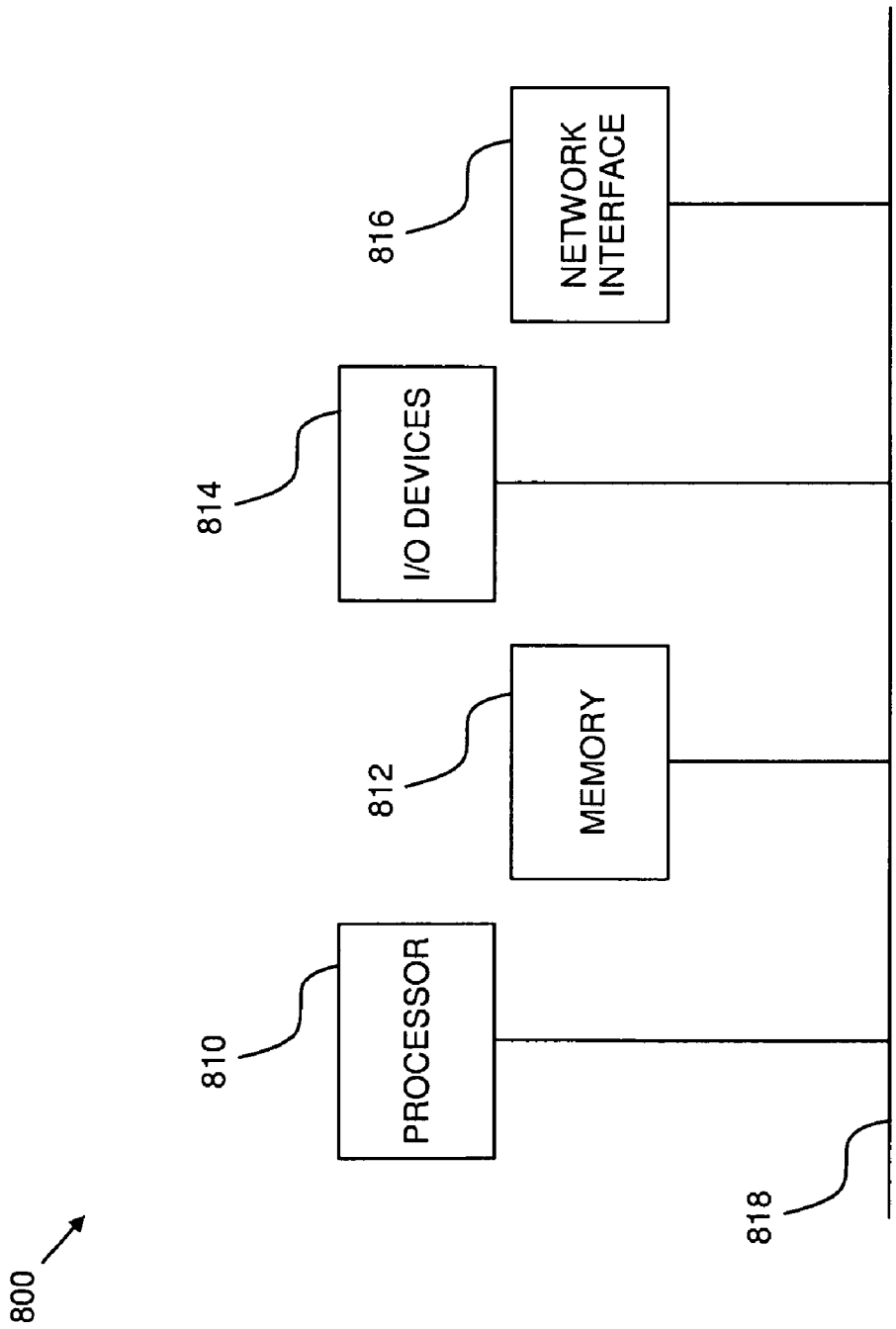

EFFICIENT BUFFER UTILIZATION IN A COMPUTER NETWORK-BASED MESSAGING SYSTEM

FIELD OF THE INVENTION

The present invention relates to computer network-based messaging systems in general, and more particularly to efficient buffer utilization in a computer network-based messaging system.

BACKGROUND OF THE INVENTION

In a typical computer network based messaging system, a messaging client prepares a message for transmission and passes the message to messaging middleware that buffers outgoing messages into one of several buffers that the middleware gets from a buffer pool. When the middleware decides that it is time to actually transmit the messages in a buffer, the middleware stops buffering messages to that buffer, and the buffer is queued for transmission. After the messages are flushed from the buffer (i.e., are transmitted), and either a sufficient amount of time has passed or acknowledgments are received from the message recipients that the messages were received, only then is the buffer typically returned to the buffer pool for reuse.

One shortcoming of such systems is that buffers are not typically completely filled before they are queued. Unused buffer space means that more buffers need to be allocated than would need to be if the buffers were completely filled before queuing. Also, not returning a buffer to the buffer pool immediately after it is flushed means that more buffers need to be allocated than would need to be if buffers were available for reuse sooner. Furthermore, when buffer space is limited, the middleware might run out of buffers due to such inefficient use of buffer space.

SUMMARY OF THE INVENTION

The present invention in embodiments thereof discloses novel systems and methods for efficient buffer utilization in a computer network-based messaging system.

In one aspect of the present invention a method is provided for buffering messages, the method including configuring a buffer manager to maintain a head index indicating a head boundary between a logically last message in a message buffer within a computer memory and a logically next write-available location in a logical write direction past the logically last message within the message buffer, maintain a tail index indicating a tail boundary between a logically last write-available location in the logical write direction within the message buffer and a logically first message within the message buffer, the head index and the tail index defining a logically-contiguous write-available region spanning from the head boundary to the tail boundary in the write direction, insert at least one free buffer segment, allocatable from a buffer pool within the computer memory, into the write-available region of the message buffer when the message buffer is nonempty, and remove a portion of the write-available region of the message buffer to the buffer pool when the message buffer is nonempty, configuring a buffer writing mechanism to write a message to the write-available region of the message buffer beginning at the logically next write-available location, and configuring a buffer reading mechanism to read the logically first message within the message buffer, where the configuring a buffer manager step further includes configuring the buffer manager to advance the head index to indicate a new head boundary between a new logically last message in the message buffer and a new logically next write-available location in the logical write direction past the new logically last message within the message buffer, and advance the tail index to indicate a new tail boundary between a new logically last write-available location past the logically first message in the logical write direction within the message buffer and a new logically first message within the message buffer.

In another aspect of the present invention the step of configuring the buffer manager includes configuring the buffer manager to insert the at least one free buffer into the write-available region of the message buffer after determining that a message that is to be written to the message buffer exceeds a predefined portion of the write-available region.

In another aspect of the present invention the step of configuring the buffer manager includes configuring the buffer manager to remove the predefined portion of the write-available region of the message buffer to the buffer pool when the write-available region exceeds a predefined size.

In another aspect of the present invention the step of configuring the buffer manager includes configuring the buffer manager to remove the predefined portion of the write-available region of the message buffer to the buffer pool when the write-available region exceeds a predefined portion of the message buffer.

In another aspect of the present invention a method is provided for buffering messages, the method including receiving a message from a messaging client, writing the message to a logically-contiguous write-available region of a message buffer starting at a logically next write-available location within the write-available region, updating a head index to indicate a head boundary between a logically last message in the message buffer and a logically next write-available location in the message buffer, defining a packet including the message within the message buffer, transmitting a packet that includes a logically first message in the message buffer, and updating a tail index to indicate a tail boundary between a new logically last write-available location in the message buffer and a new logically first message in the message buffer.

In another aspect of the present invention the writing step includes writing the message if the logically-contiguous write-available region of the message buffer is large enough to hold the message.

In another aspect of the present invention the method further includes retrieving at least one free buffer segment from a buffer pool if the logically-contiguous write-available region of the message buffer is not large enough to hold the message, and inserting the free buffer segment into the write-available region, where the retrieving and inserting steps are performed prior to performing the writing step.

In another aspect of the present invention the method further includes queuing for transmission of the packet a packet record associated with the packet, where the queuing step is performed when at least one predefined queuing criterion is met.

In another aspect of the present invention the queuing step includes queuing when the packet reaches a predefined size.

In another aspect of the present invention the queuing step includes queuing when a predefined length of time has passed from when the packet was created.

In another aspect of the present invention the method further includes configuring the buffer manager to receive the message as part of a packet, configuring the buffer writing mechanism to write the message together with the packet, and configuring the buffer reading mechanism to read the packets in a packet order, where the buffer manager is further configured to advance the tail index past the location of a previously-read packet as indicated by a gap record.

In another aspect of the present invention a method is provided for buffering messages, the method including receiving a packet, writing the packet to a logically-contiguous write-available region of a message buffer starting at a logically next write-available location within the write-available region, updating a head index to indicate a head boundary between a logically last packet in the message buffer and a logically next write-available location in the message buffer, providing to a destination application a logically next packet in the message buffer in accordance with a packet order, and if the provided packet is the logically first packet in the message buffer, advancing the tail index to indicate the next packet to be provided to the destination application in accordance with the packet order, past the provided packet and any intermediate locations of packets previously-provided to the destination application.

In another aspect of the present invention the method further includes creating a gap record indicating the location of a packet within the message buffer that has been provided to the destination application if the packet is not the logically first packet in the message buffer.

In another aspect of the present invention a system is provided for buffering messages, the system including a buffer manager configured to maintain a head index indicating a head boundary between a logically last message in a message buffer within a computer memory and a logically next write-available location in a logical write direction past the logically last message within the message buffer, maintain a tail index indicating a tail boundary between a logically last write-available location in the logical write direction within the message buffer and a logically first message within the message buffer, the head index and the tail index defining a logically-contiguous write-available region spanning from the head boundary to the tail boundary in the write direction, insert at least one free buffer segment, allocatable from a buffer pool within the computer memory, into the write-available region of the message buffer when the message buffer is nonempty, and remove a portion of the write-available region of the message buffer to the buffer pool when the message buffer is nonempty, a buffer writing mechanism configured to write a message to the write-available region of the message buffer beginning at the logically next write-available location, and a buffer reading mechanism configured to read the logically first message within the message buffer, where the buffer manager is further configured to advance the head index to indicate a new head boundary between a new logically last message in the message buffer and a new logically next write-available location in the logical write direction past the new logically last message within the message buffer, and advance the tail index to indicate a new tail boundary between a new logically last write-available location past the logically first message in the logical write direction within the message buffer and a new logically first message within the message buffer, and where any of the buffer manager, buffer writing mechanism, and buffer reading mechanism are implemented in either of computer hardware and computer software embodied in a computer-readable medium.

In another aspect of the present invention the buffer manager is configured to insert the at least one free buffer into the write-available region of the message buffer after determining that a message that is to be written to the message buffer exceeds a predefined portion of the write-available region.

In another aspect of the present invention the buffer manager is configured to remove the predefined portion of the write-available region of the message buffer to the buffer pool when the write-available region exceeds a predefined size.

In another aspect of the present invention the buffer manager is configured to remove the predefined portion of the write-available region of the message buffer to the buffer pool when the write-available region exceeds a predefined portion of the message buffer.

In another aspect of the present invention a system is provided for buffering messages, the system including a buffer manager configured to receive a message from a messaging client, a buffer writing mechanism configured to write the message to a logically-contiguous write-available region of a message buffer starting at a logically next write-available location within the write-available region, where the buffer manager is further configured to update a head index to indicate a head boundary between a logically last message in the message buffer and a logically next write-available location in the message buffer, and define a packet including the message within the message buffer, and a buffer reading mechanism configured to transmit a packet that includes a logically first message in the message buffer, where the buffer manager is further configured to update a tail index to indicate a tail boundary between a new logically last write-available location in the message buffer and a new logically first message in the message buffer.

In another aspect of the present invention the buffer writing mechanism is configured to write the message if the logically-contiguous write-available region of the message buffer is large enough to hold the message.

In another aspect of the present invention the buffer manager is further configured to retrieve at least one free buffer segment from a buffer pool if the logically-contiguous write-available region of the message buffer is not large enough to hold the message, and insert the free buffer segment into the write-available region, where the retrieving and inserting steps are performed prior to performing the writing step.

In another aspect of the present invention the buffer manager is further configured to queue for transmission of the packet a packet record associated with the packet, where the packet record is queued when at least one predefined queuing criterion is met.

In another aspect of the present invention the buffer manager is further configured to queue the packet record when the packet reaches a predefined size.

In another aspect of the present invention the buffer manager is further configured to queue the packet record when a predefined length of time has passed from when the packet was created.

In another aspect of the present invention the buffer manager is further configured to receive the message as part of a packet, where the buffer writing mechanism is further configured to write the message together with the packet, where the buffer reading mechanism is further configured to read the packets in a packet order, and where the buffer manager is further configured to advance the tail index past the location of a previously-read packet as indicated by a gap record.

In another aspect of the present invention a system is provided for buffering messages, the system including a buffer manager configured to receive a packet, a buffer writing mechanism configured to write the packet to a logically-contiguous write-available region of a message buffer starting at a logically next write-available location within the write-available region, where the buffer manager is configured to update a head index to indicate a head boundary between a logically last packet in the message buffer and a logically next write-available location in the message buffer, and a buffer reading mechanism configured to read a logically next packet in the message buffer in accordance with a packet order and provide any messages in the packet to a destination application, where the buffer manager is configured to, if the provided packet is the logically first packet in the message buffer, advance the tail index to indicate the next packet to be provided to the destination application in accordance with the packet order, past the provided packet and any intermediate locations of packets previously-provided to the destination application.

In another aspect of the present invention the buffer manager is further configured to create a gap record indicating the location of a packet within the message buffer that has been provided to the destination application if the packet is not the logically first packet in the message buffer.

BRIEF DESCRIPTION OF THE DRAWINGS

The present invention will be understood and appreciated more fully from the following detailed description taken in conjunction with the appended drawings in which:

FIG. 8 is a simplified block diagram illustration of an exemplary hardware implementation of a computing system, constructed and operative in accordance with an embodiment of the present invention.

DETAILED DESCRIPTION OF THE INVENTION

Figure 1:
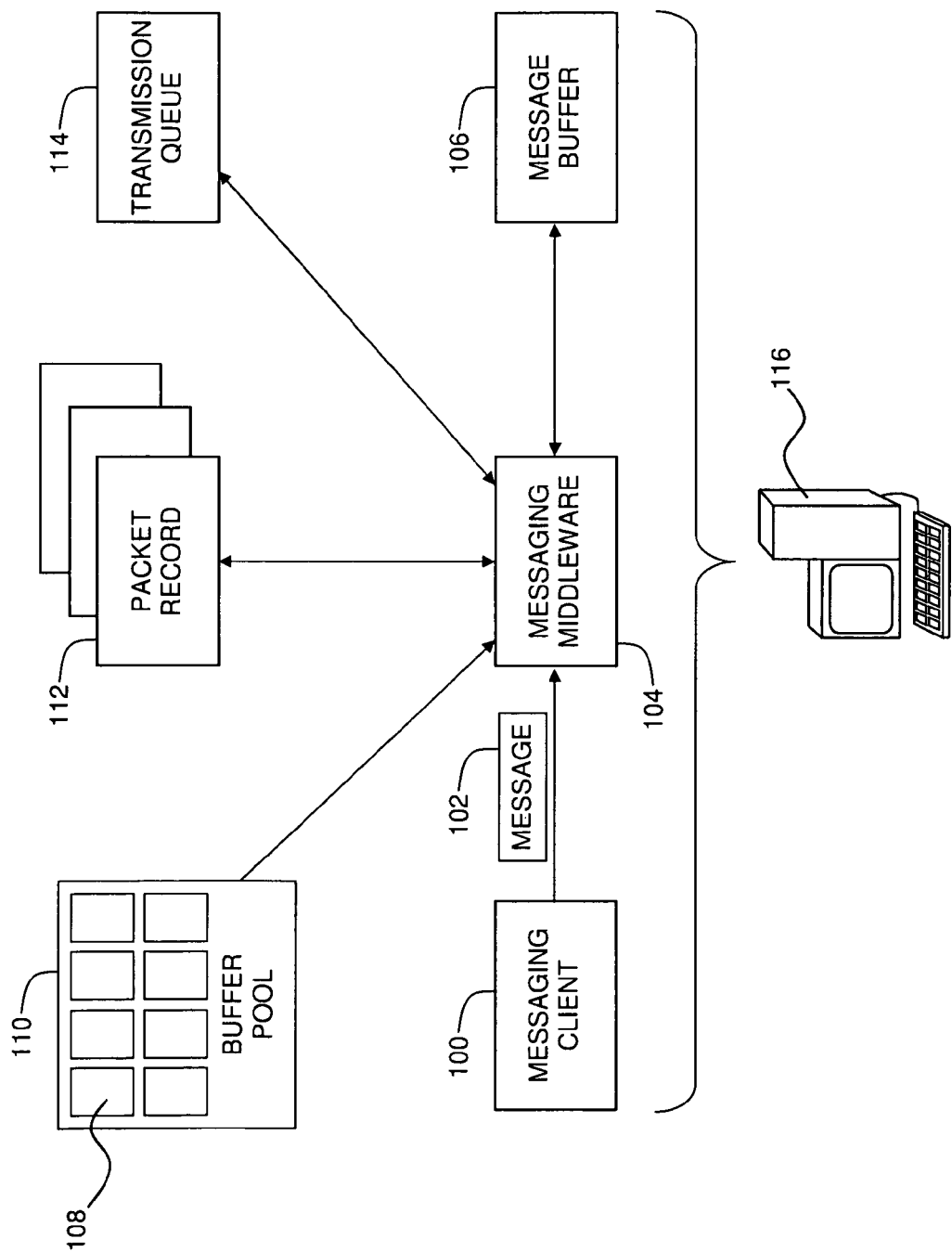
FIG. 1 is a simplified conceptual illustration of a system for efficient buffer utilization in a computer network-based messaging system, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for efficient buffer utilization in a computer network-based messaging system, constructed and operative in accordance with an embodiment of the present invention. The system of FIG. 1 may be understood in the context of an exemplary operational scenario in which a messaging client 100 prepares a message 102 for transmission and passes message 102 to messaging middleware 104. Middleware 104 writes message 102 to a message buffer 106, which is typically implemented in a computer memory. Middleware 104 typically maintains a separate message buffer for each data flow among a group of data flows, where a data flow is defined herein as an ordered stream of messages originating at a single source node and destined for one or more target nodes. If there is no room for message 102 to be written to message buffer 106, middleware 104 preferably inserts one or more free (i.e., unused and available) buffer segments 108 from a buffer pool 110 into message buffer 106.

Middleware 104 preferably groups the messages in message buffer 106 into one or more packets of contiguously stored messages within message buffer 106, with each packet including one or more messages. For each packet, middleware 104 preferably creates a packet record 112 which indicates where the packet is found within message buffer 106. When middleware 104 decides, using any known packet transmission criteria, that it is time to transmit a packet, middleware 104 preferably places the associated packet record 112 into a transmission queue 114 of other packet records of packets waiting to be transmitted. When it is the turn of a packet record in queue 114 to have it's associated packet be processed for transmission, the messages in the packet indicated by the packet record read from the buffer and are transmitted. Transmitted packet messages may be retained in message buffer 106 in accordance with any predefined retention scheme, such as for a predetermined time and/or until an acknowledgement is received from a recipient that the packet was received. If message buffer 106 is larger than is required, such as may be determined using any predefined formula to identify and quantify excess capacity, middleware 104 preferably reduces its size by removing one or more free (i.e., unused and available) buffer segments 108 from message buffer 106 and placing them into buffer pool 110.

Any of the elements shown in FIG. 1 are preferably executed by or otherwise made accessible to a computer 116, such as by implementing any of the elements shown in FIG. 1 in computer hardware and/or in computer software embodied in a computer-readable medium in accordance with conventional techniques.

Figure 2A:
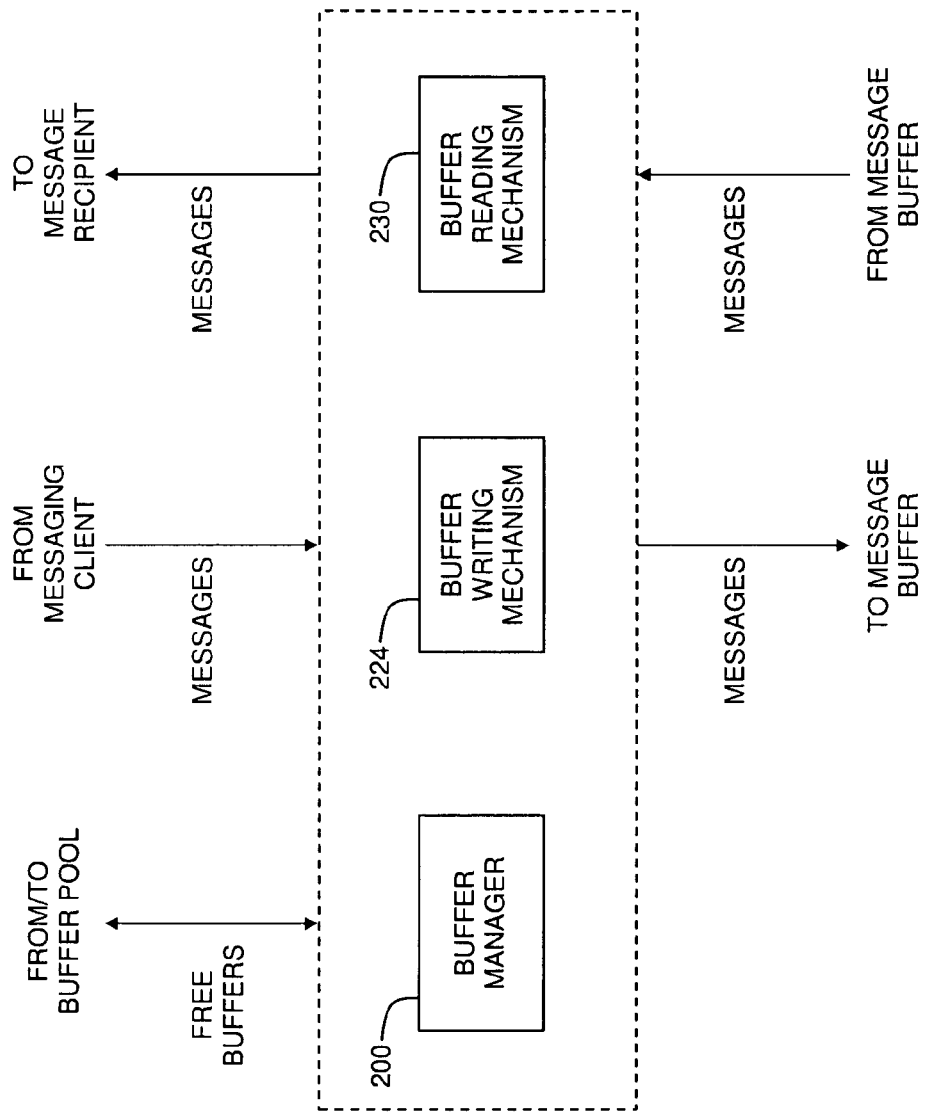
FIG. 2A is a simplified conceptual illustration of elements of messaging middleware, constructed and operative in accordance with an embodiment of the present invention.
Figure 2B:
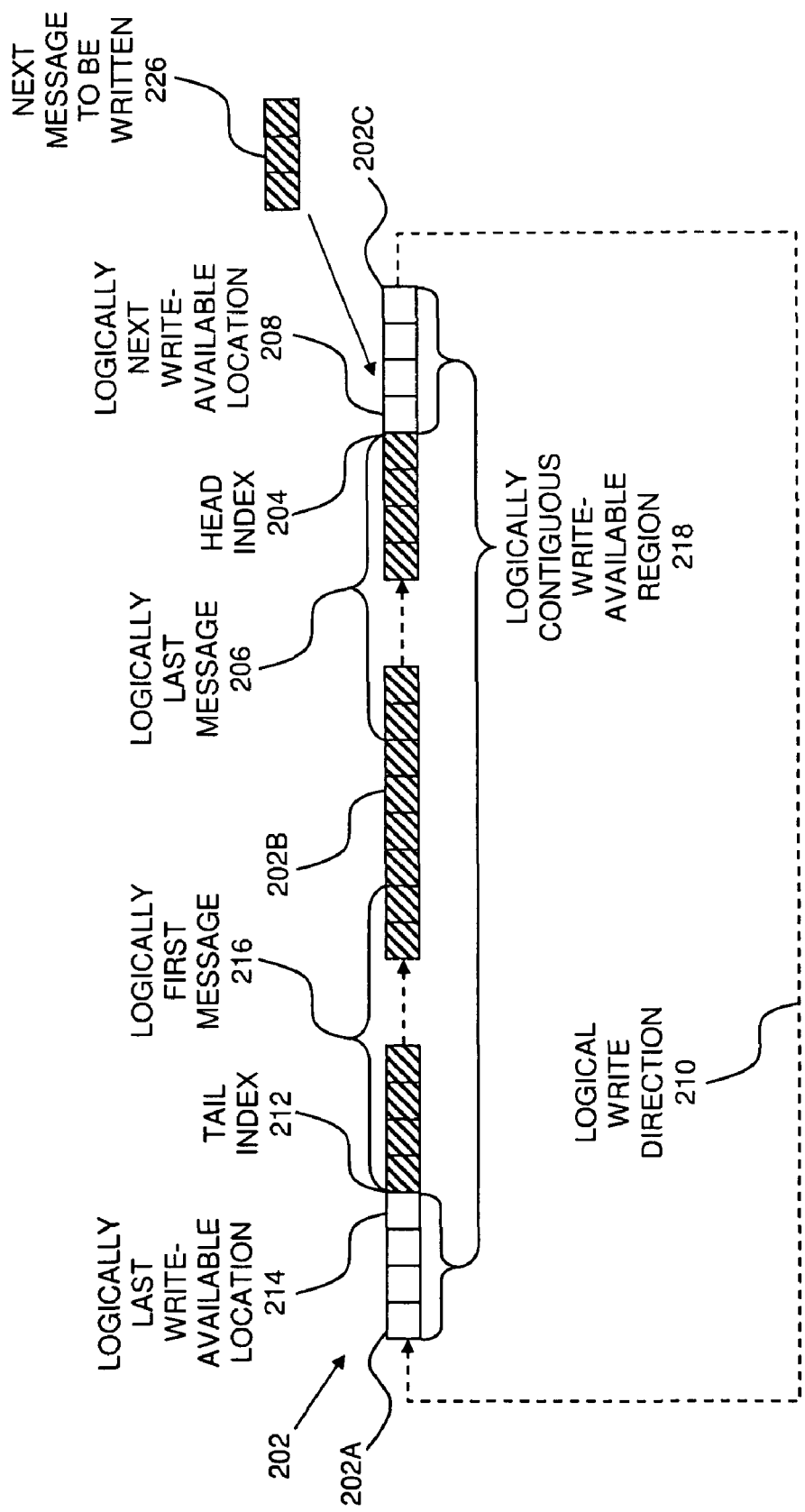
FIGS. 2B, 2C, and 2D are simplified conceptual illustrations of an exemplary message buffer, constructed and operative in accordance with an embodiment of the present invention.
Figure 2C:
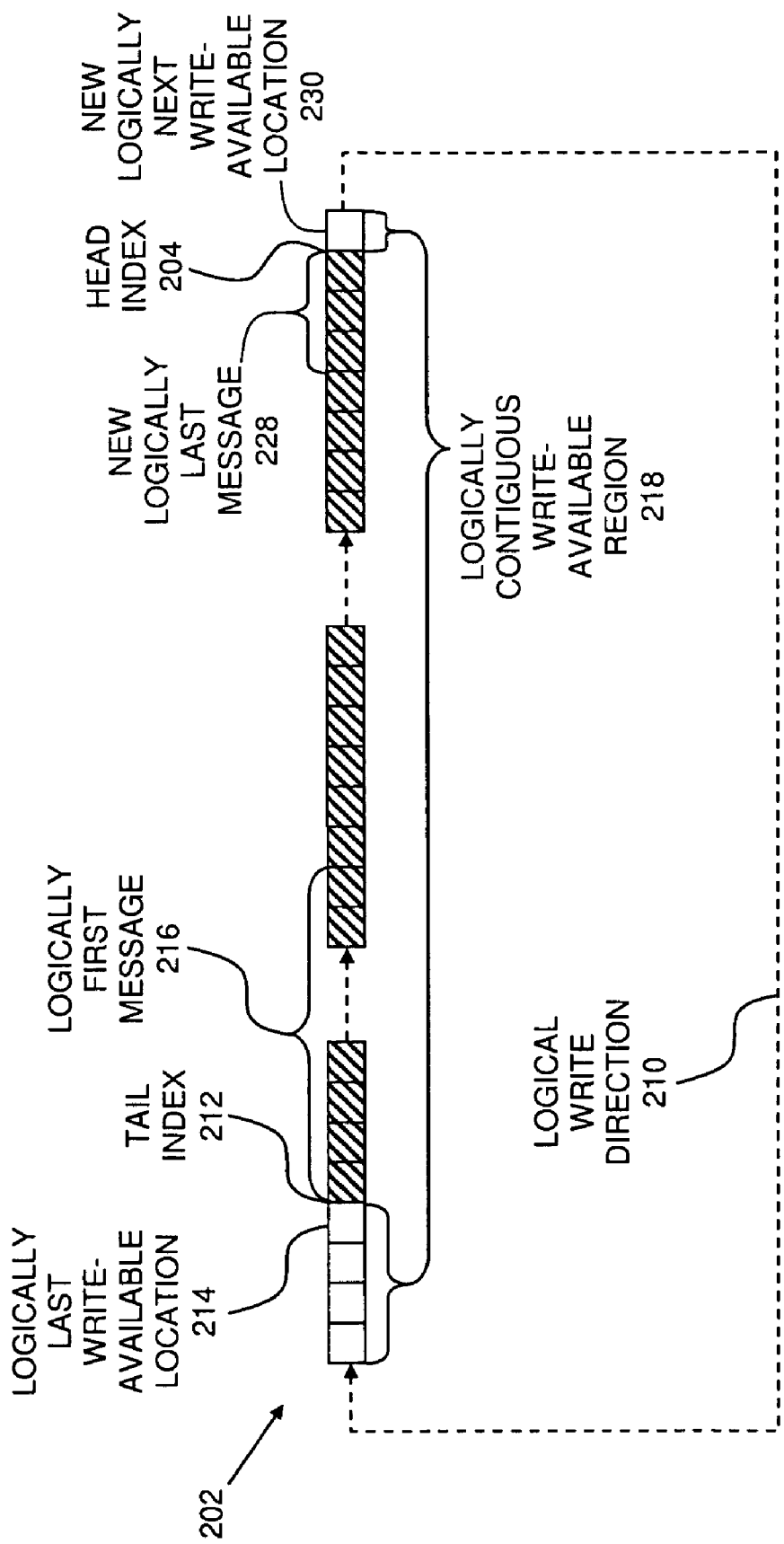
Figure 2D:
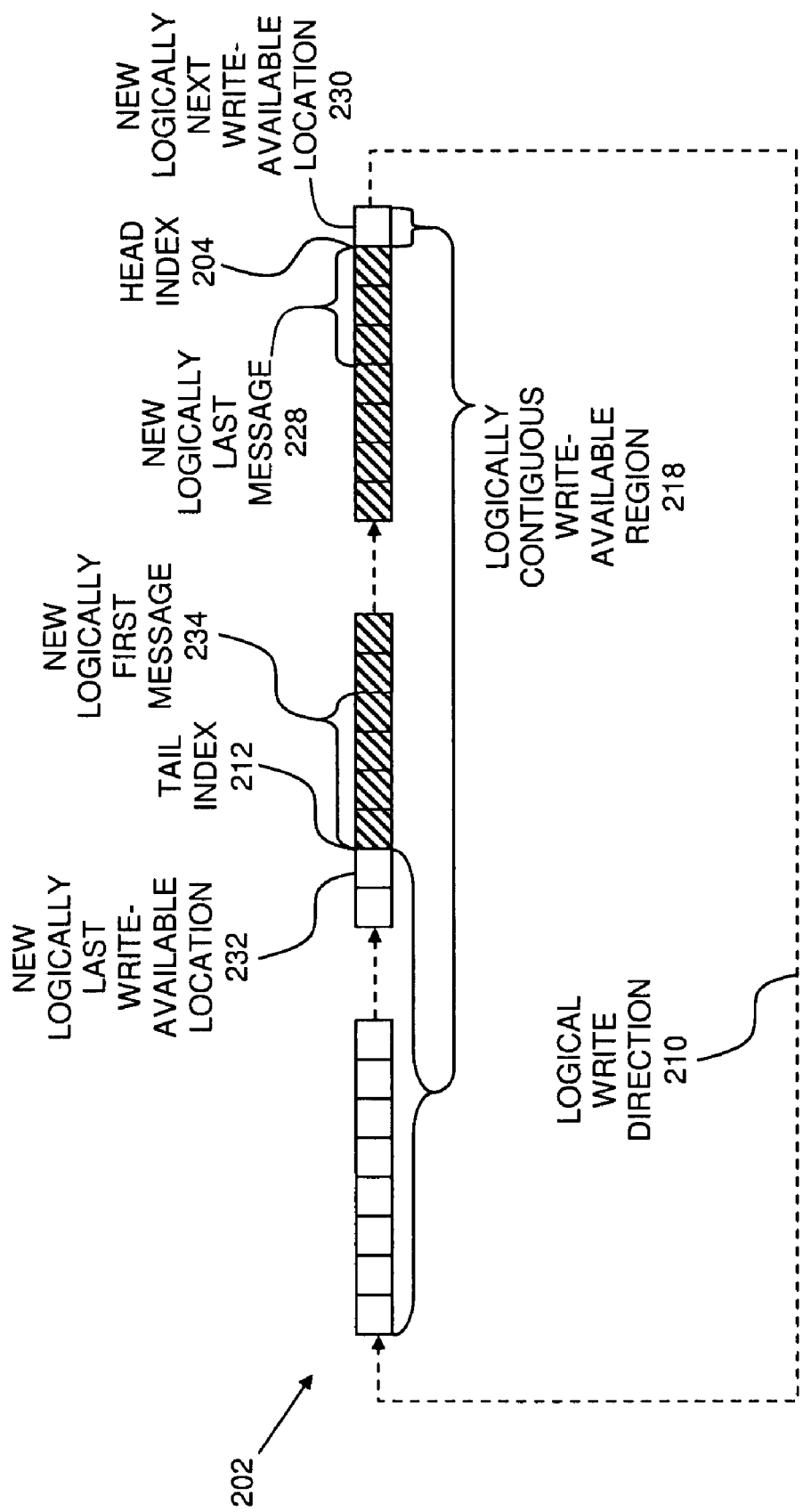

Reference is now made to FIG. 2A, which is a simplified conceptual illustration of elements of messaging middleware, constructed and operative in accordance with an embodiment of the present invention, and additionally to FIGS. 2B, 2C, and 2D, which are simplified conceptual illustrations of an exemplary message buffer, constructed and operative in accordance with an embodiment of the present invention. Shown in FIG. 2A are messaging middleware elements, such as may be used by messaging middleware 104 of FIG. 1, including a buffer manager 200, a buffer writing mechanism 224, and a buffer reading mechanism 230. Buffer manager 200 is preferably configured to receive messages from a messaging client and manage a message buffer, generally designated 202, shown in FIG. 2B, into which messages will be stored and from which those messages will be read for transmission. Message buffer 202 is preferably constructed from one or more buffer segments, such as segments 202A, 202B, and 202C, that are allocated for this purpose from a buffer pool, and which are logically ordered to form a logically contiguous buffer. Buffer manager 200 preferably maintains a head index 204 indicating a head boundary between a logically last message 206 in message buffer 202 and a logically next write-available location 208 in a logical write direction, indicated by an arrow 210, past logically last message 206. Buffer manager 200 also preferably maintains a tail index 212 indicating a tail boundary between a logically last write-available location 214 in logical write direction 210 within message buffer 202 and a logically first message 216. Head index 204 and tail index 212 define a logically-contiguous write-available region 218 spanning from the head boundary indicated by head index 204 to the tail boundary indicated by tail index 212 in said logical write direction 210. Being logically contiguous, a message may be written past the "end" of message buffer 202 and continue to be written from the "beginning" of message buffer 202.

Buffer manager 200 is also preferably configured to insert one or more free buffer segments that are allocatable from a buffer pool into write-available region 218 of message buffer 202. This insertion may be performed when message buffer 202 includes one or more messages. Buffer manager 200 is also preferably configured to remove a portion of write-available region 218 of message buffer 202, effectively putting one or more free buffer segments into the buffer pool. As with free buffer segment insertion, this removal may be performed when message buffer 202 includes one or more messages.

Also shown in FIG. 2A, buffer writing mechanism 224 is preferably configured to write a message 226, shown in FIG. 2B, having been received from a messaging client, to write-available region 218 of message buffer 202 beginning at logically next write-available location 208. Buffer manager 200 then advances head index 204 as is shown in FIG. 2C to indicate a new head boundary between a new logically last message 228 in message buffer 202, such as the just-written message 226, and a new logically next write-available location 230 in logical write direction 210 past new logically last message 228.

Buffer reading mechanism 230 shown in FIG. 2A is preferably configured to read logically first message 216 within message buffer 202, such as in order to transmit message 216 as part of a transmission packet. After it is determined that a read message is no longer needed, such as after a packet containing the message has been transmitted, and after any retention criteria have been met, buffer manager 200 then advances tail index 212 as is shown in FIG. 2D to indicate a new tail boundary between a new logically last write-available location 232 past logically first message 216 in logical write direction 210 and a new logically first message 234 within message buffer 202.

Figure 3:
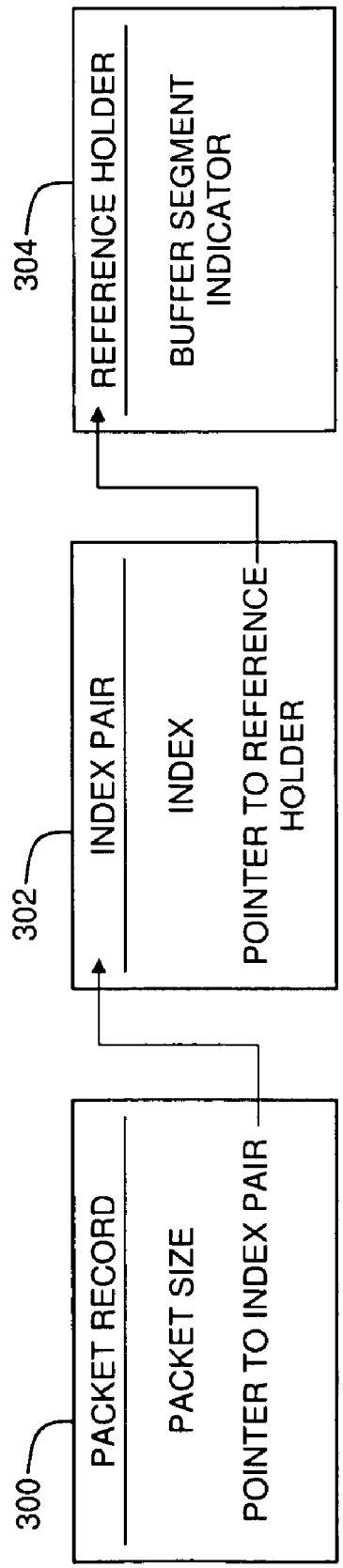
FIG. 3 is a simplified conceptual illustration of a packet record and associated records, constructed and operative in accordance with an embodiment of the present invention.

Reference is now made to FIG. 3, which is a simplified conceptual illustration of a packet record and associated records, constructed and operative in accordance with an embodiment of the present invention. In FIG. 3 a packet record 300, such as may be used by for packet record 112 of FIG. 1, preferably includes a packet size, a buffer segment indicator indicating a buffer segment within a message buffer, such as message buffer 202 (FIG. 2B), and an index indicating the location within the buffer segment where the packet begins. In one embodiment, the packet size, the buffer segment indicator, and the index are stored in separate records, such as where packet record 300 includes the packet size and a pointer to an index pair record 302, which itself includes the index and a pointer to a reference holder record 304, which includes the buffer segment indicator.

Figure 4:
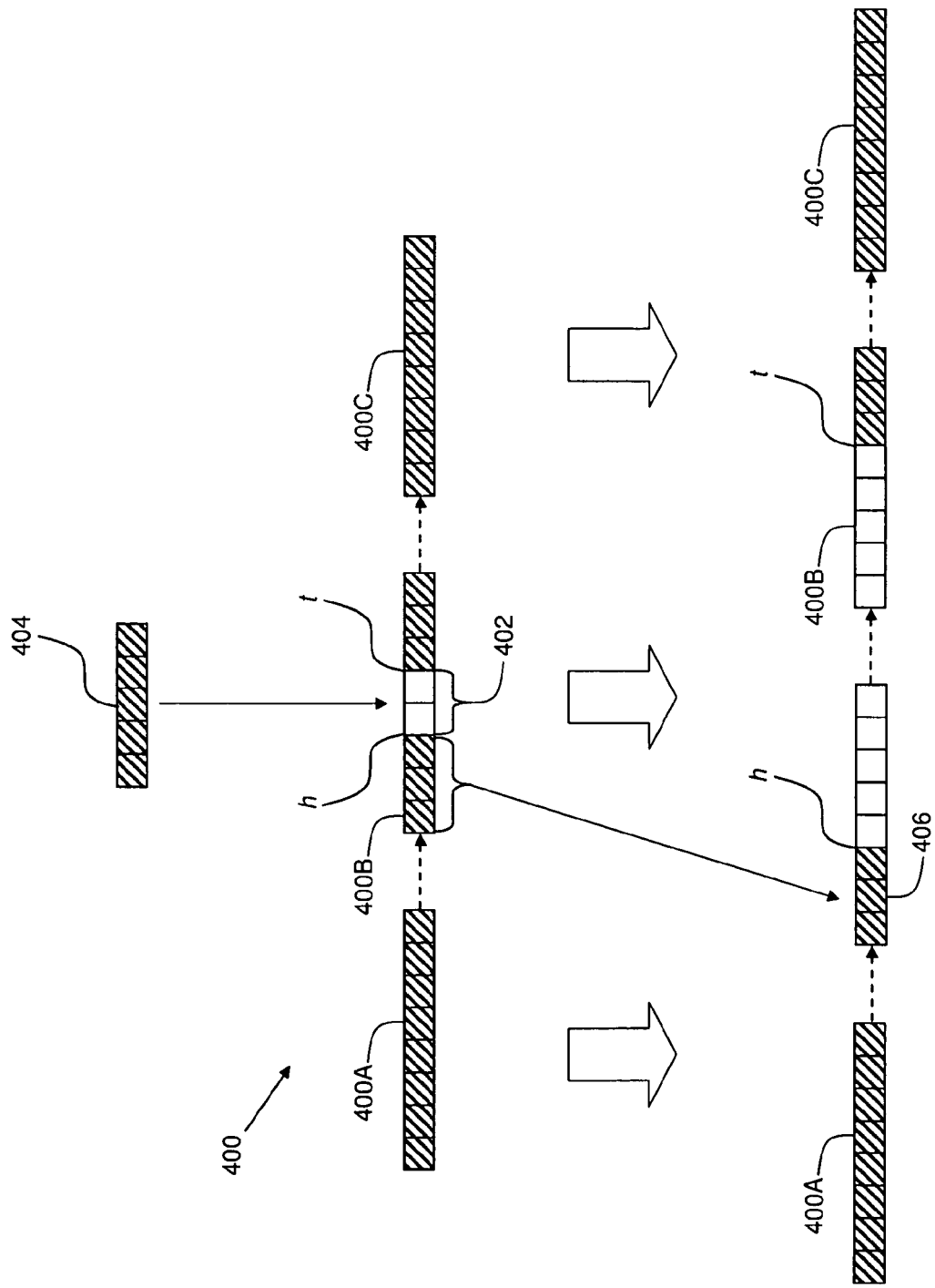
FIG. 4 is a simplified conceptual illustration of an exemplary scenario demonstrating free buffer segment insertion, constructed and operative in accordance with an embodiment of the present invention.

Reference is now made to FIG. 4, which is a simplified conceptual illustration of an exemplary scenario demonstrating free buffer segment insertion, constructed and operative in accordance with an embodiment of the present invention. In FIG. 4 a message buffer, generally designated 400, includes three buffer segments 400A, 400B, and 400C. In the example shown, a head index h and a tail index t both lie within buffer segment 400B, with a write-available region 402 between them. If write-available region 402 is not large enough for a message 404 to be written to it, a free buffer segment 406 is preferably inserted into message buffer 400 between buffer segments 400A and 400B, and any data in buffer segment 400B preceding head index h is moved to corresponding locations in buffer segment 406, with head index h updated accordingly.

Figure 5:
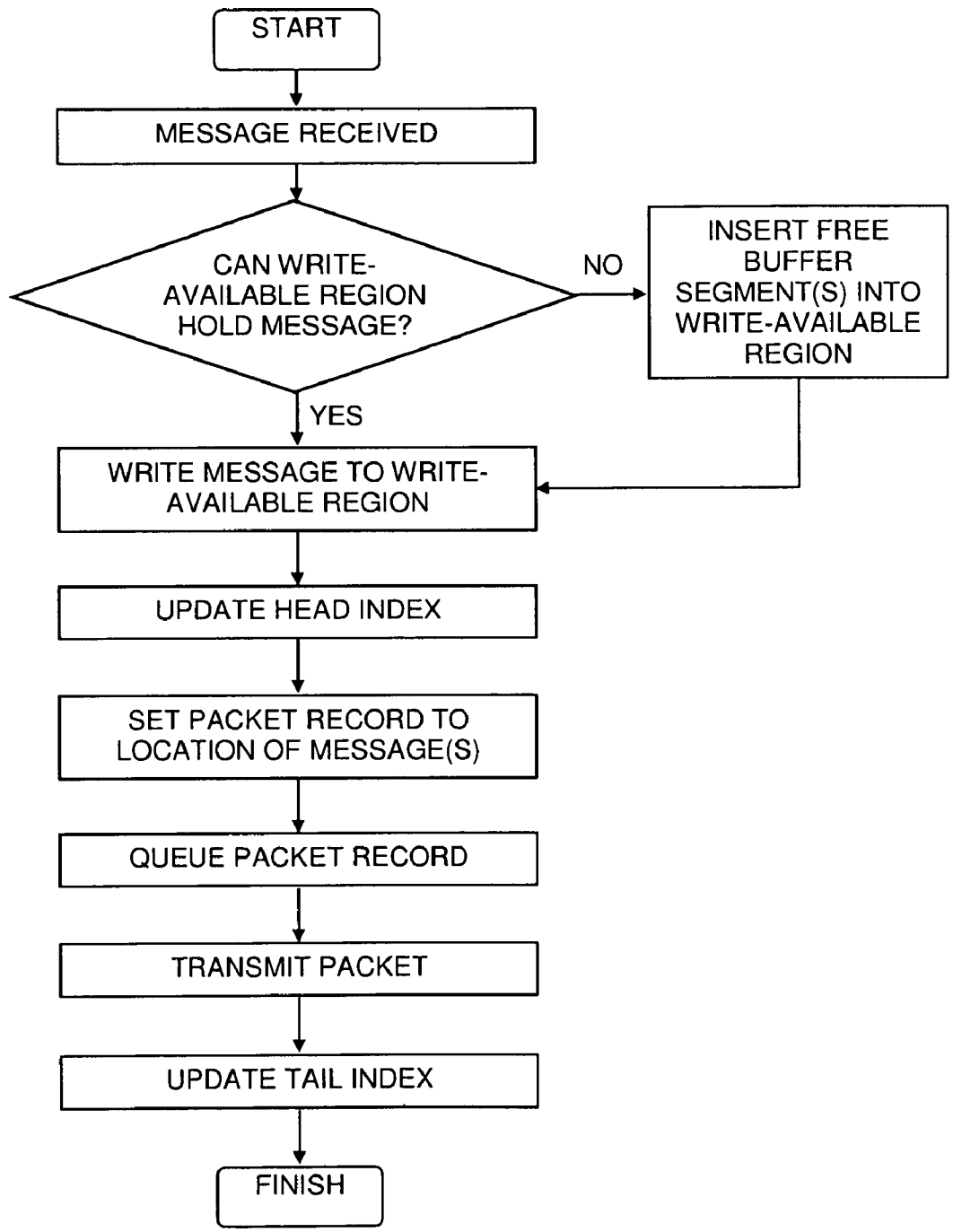
FIG. 5 is a simplified flowchart illustration of an exemplary method of operation of the system of FIGS. 1-4, operative in accordance with an embodiment of the present invention.

Reference is now made to FIG. 5, which is a simplified flowchart illustration of an exemplary method of operation of the system of FIGS. 1-4, operative in accordance with an embodiment of the present invention. In the method of FIG. 5 a message is received from a messaging client for storage in a message buffer. If a logically-contiguous write-available region of the message buffer is large enough to hold the message, the message is written to the region starting at a logically next write-available location. If the message is larger than the write-available region, one or more free buffer segments are retrieved from a buffer pool and inserted into the write-available region, and the message is written to the region starting at a logically next write-available location. A head index is updated to indicate a head boundary between a logically last message in the message buffer and a logically next write-available location in the buffer. A packet record defining a packet is set to include the location of the message within the message buffer. The packet record is queued for transmission when predefined queuing criteria are met, such as when the packet reaches a predefined size and/or when a predefined length of time has passed from when the packet was created. The next packet to be transmitted is the packet that includes the logically first message in the message buffer. The messages in the packet to be transmitted are read from the message buffer starting from the logically first message in the message buffer. After predefined retention criteria are met for the read packet, a tail index is updated to indicate a tail boundary between a logically last write-available location in the message buffer and a logically first message in the buffer.

Figure 6:
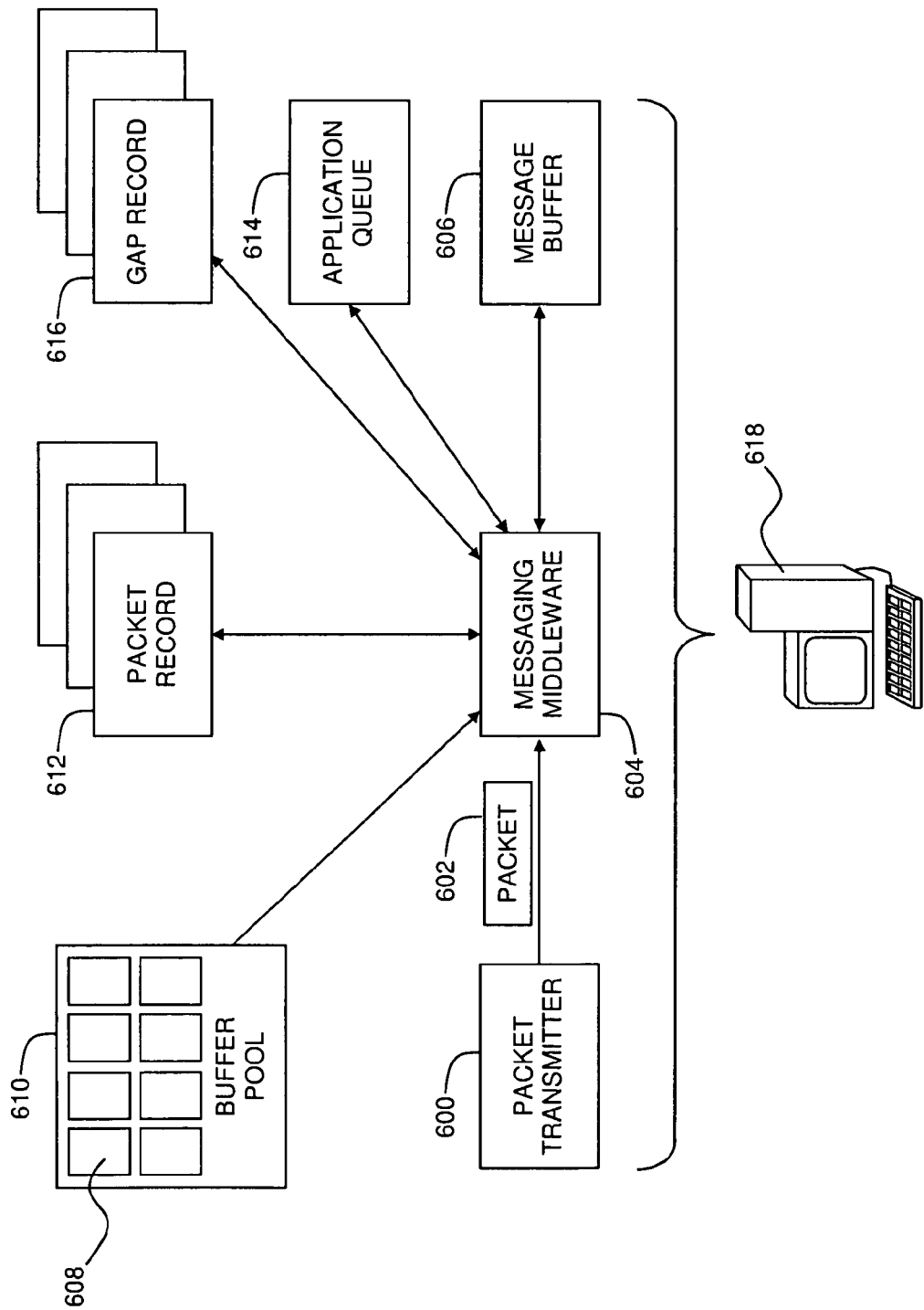
FIG. 6 is a simplified conceptual illustration of a system for efficient buffer utilization in a computer network-based messaging system, constructed and operative in accordance with an embodiment of the present invention.

Reference is now made to FIG. 6 which is a simplified conceptual illustration of a system for efficient buffer utilization in a computer network-based messaging system, constructed and operative in accordance with an embodiment of the present invention. The system of FIG. 6 is substantially similar to the system of FIG. 1 with the notable exception that the system of FIG. 6 is operative for a recipient of transmitted packets, such as of packets that are transmitted by the system of FIG. 1. Thus in the system of FIG. 6. packets 602 are received at a packet receiver 600 by messaging middleware 604 which manages a message buffer 606 generally as described hereinabove for message buffer 106 (FIG. 1). Packet records 612 are preferably created for each received packet 602 and are queued in an application queue 614 for providing the packets to an application that is to receive the packets. Packets are written to message buffer 606 in the order in which they are received, which may be out of order relative to the order in which the application is to receive the packets. Packets are queued and read in the order in which the application is to receive the packets, where the packet order is determined using any known packet ordering scheme. If a packet is queued and read out of order, a gap record 616 is created indicating the location within message buffer 606 of the out-of-order packet. When the logically first packet in message buffer 606 is queued and read, and the tail index is subsequently advanced, if the tail index is advanced to the location of a previously-read packet as indicated by a gap record, the tail index is preferably advanced past the location indicated by the gap record. If message buffer 606 is larger than is required, such as may be determined using any predefined formula to identify and quantify excess capacity, middleware 604 preferably reduces its size by removing one or more free (i.e., unused and available) buffer segments 608 from message buffer 606 and placing them into buffer pool 610.

Any of the elements shown in FIG. 6 are preferably executed by or otherwise made accessible to a computer 618, such as by implementing any of the elements shown in FIG. 6 in computer hardware and/or in computer software embodied in a computer-readable medium in accordance with conventional techniques.

Figure 7:
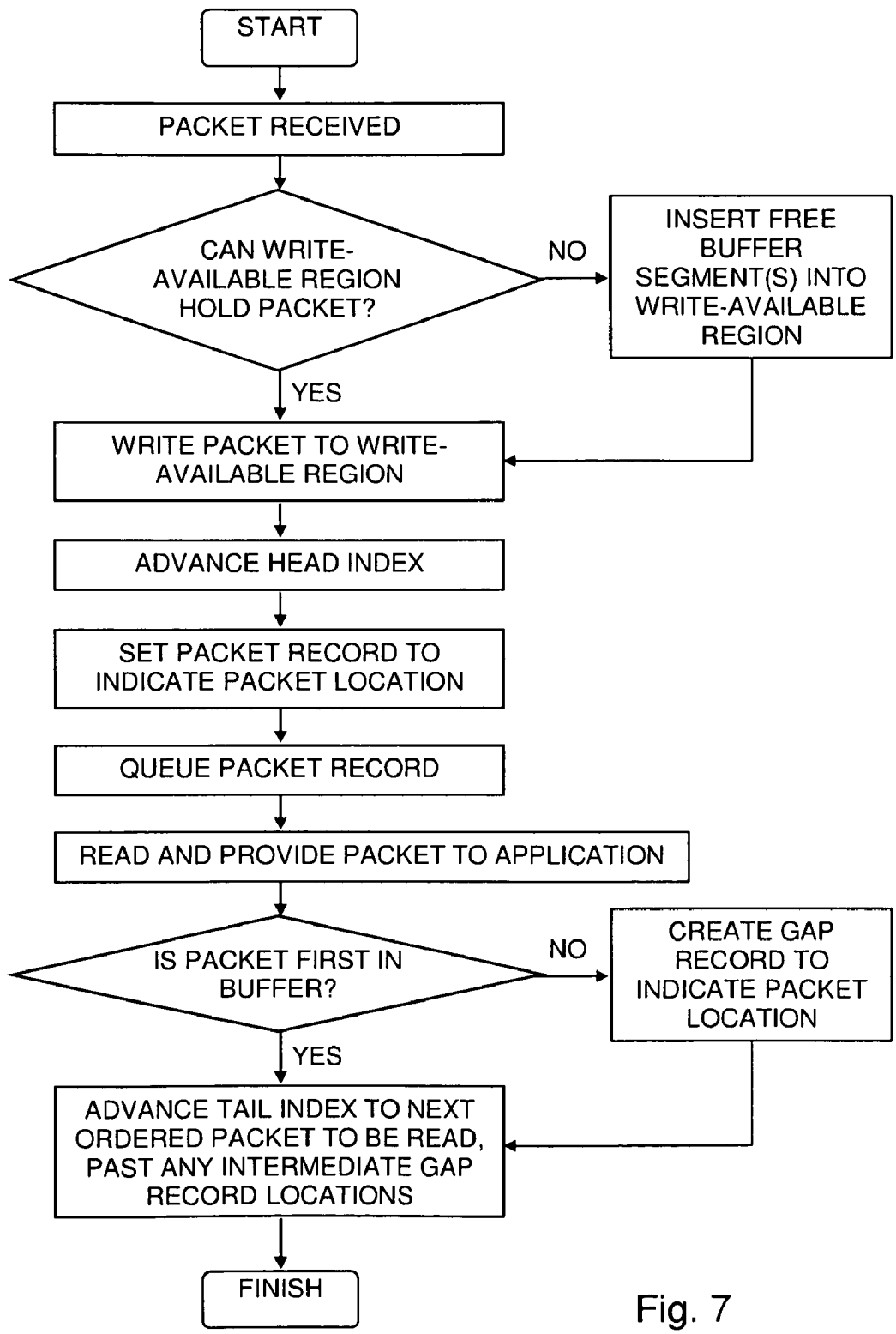
FIG. 7 is a simplified flowchart illustration of an exemplary method of operation of the system of FIG. 6, operative in accordance with an embodiment of the present invention.

Reference is now made to FIG. 7, which is a simplified flowchart illustration of an exemplary method of operation of the system of FIG. 6, operative in accordance with an embodiment of the present invention. In the method of FIG. 7 a packet transmission is received at a recipient computer which stores the packet in a message buffer prior to providing the packet to a destination application. If a logically-contiguous write-available region of the message buffer is large enough to hold the packet, the packet is written to the region starting at a logically next write-available location. If the packet is larger than the write-available region, one or more free buffer segments are retrieved from a buffer pool and inserted into the write-available region, and the packet is written to the region starting at a logically next write-available location. A head index is updated to indicate a head boundary between a logically last packet in the message buffer and a logically next write-available location in the buffer. A packet record defining a packet is set to indicate the location of the packet within the message buffer. The next packet to be provided to the destination application is the logically next packet in accordance with a packet order, which may be a packet other than the logically first packet in the message buffer. The packets are queued in accordance with the packet order and are read from the message buffer and provided to the destination application, preferably once any applicable predefined queuing criteria are met, such as when all preceding packets in the defined packet order have been queued. After predefined retention criteria are met for the read packet, if the read packet is not the logically first packet in the message buffer, a gap record is created indicating the location of the read packet within the message buffer. If the read packet is the logically first packet in the message buffer, the tail index is advanced to indicate the next packet to be provided to the destination application in accordance with the packet order, past the read packet and any intermediate locations of previously-read packets as indicated by gap records. If the message buffer is larger than is required, its size may be reduced by removing one or more free (i.e., unused and available) buffer segments from the message buffer and placing them into a buffer pool.

Referring now to FIG. 8, block diagram 800 illustrates an exemplary hardware implementation of a computing system in accordance with which one or more components/methodologies of the invention (e.g., components/methodologies described in the context of FIGS. 1-7) may be implemented, according to an embodiment of the present invention.

As shown, the techniques for controlling access to at least one resource may be implemented in accordance with a processor 810, a memory 812, I/O devices 814, and a network interface 816, coupled via a computer bus 818 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for buffering messages, the method comprising:
   configuring a buffer manager to
      maintain a head index indicating a head boundary between a logically last message in a message buffer within a computer memory and a logically next write-available location in a logical write direction past said logically last message within said message buffer,
      maintain a tail index indicating a tail boundary between a logically last write-available location in said logical write direction within said message buffer and a logically first message within said message buffer, said head index and said tail index defining a logically-contiguous write-available region spanning from said head boundary to said tail boundary in said write direction,
      insert at least one free buffer segment, allocatable from a buffer pool within said computer memory, into said write-available region of said message buffer when said message buffer is nonempty, and
      remove a portion of said write-available region of said message buffer to said buffer pool when said message buffer is nonempty;
   configuring a buffer writing mechanism to write a message to said write-available region of said message buffer beginning at said logically next write-available location;
   configuring a buffer reading mechanism to read said logically first message within said message buffer,
   wherein said configuring a buffer manager step further comprises configuring said buffer manager to
      advance said head index to indicate a new head boundary between a new logically last message in said message buffer and a new logically next write-available location in said logical write direction past said new logically last message within said message buffer, and
      advance said tail index to indicate a new tail boundary between a new logically last write-available location past said logically first message in said logical write direction within said message buffer and a new logically first message within said message buffer;
   configuring said buffer manager to receive said message as part of a packet;
   configuring said buffer writing mechanism to write said message together with said packet; and
   configuring said buffer reading mechanism to read said packets in a packet order,
   wherein said buffer manager is further configured to advance said tail index past the location of a previously-read packet as indicated by a gap record.

2. A method according to claim 1 wherein said step of configuring said buffer manager comprises configuring said buffer manager to insert said at least one free buffer segment into said write-available region of said message buffer after determining that a message that is to be written to said message buffer exceeds a predefined portion of said write-available region.

3. A method according to claim 1 wherein said step of configuring said buffer manager comprises configuring said buffer manager to remove said predefined portion of said write-available region of said message buffer to said buffer pool when said write-available region exceeds a predefined size.

4. A method according to claim 1 wherein said step of configuring said buffer manager comprises configuring said buffer manager to remove said predefined portion of said write-available region of said message buffer to said buffer pool when said write-available region exceeds a predefined portion of said message buffer.

5. A system for buffering messages, the system comprising:
   a buffer manager configured to
      maintain a head index indicating a head boundary between a logically last message in a message buffer within a computer memory and a logically next write-available location in a logical write direction past said logically last message within said message buffer,
      maintain a tail index indicating a tail boundary between a logically last write-available location in said logical write direction within said message buffer and a logically first message within said message buffer, said head index and said tail index defining a logically-contiguous write-available region spanning from said head boundary to said tail boundary in said write direction,
      insert at least one free buffer segment, allocatable from a buffer pool within said computer memory, into said write-available region of said message buffer when said message buffer is nonempty, and
      remove a portion of said write-available region of said message buffer to said buffer pool when said message buffer is nonempty;
   a buffer writing mechanism configured to write a message to said write-available region of said message buffer beginning at said logically next write-available location; and
   a buffer reading mechanism configured to read said logically first message within said message buffer,
   wherein said buffer manager is further configured to
      advance said head index to indicate a new head boundary between a new logically last message in said message buffer and a new logically next write-available location in said logical write direction past said new logically last message within said message buffer, and
      advance said tail index to indicate a new tail boundary between a new logically last write-available location past said logically first message in said logical write direction within said message buffer and a new logically first message within said message buffer,
   wherein said buffer manager is further configured to receive said message as part of a packet,
   wherein said buffer writing mechanism is further configured to write said message together with said packet,
   wherein said buffer reading mechanism is further configured to read said packets in a packet order, and
   wherein said buffer manager is further configured to advance said tail index past the location of a previously-read packet as indicated by a gap record,
   and wherein any of said buffer manager, buffer writing mechanism, and buffer reading mechanism are implemented in either of computer hardware and computer software embodied in a non-transitory computer-readable medium.

6. A system according to claim 5 wherein said buffer manager is configured to insert said at least one free buffer segment into said write-available region of said message buffer after determining that a message that is to be written to said message buffer exceeds a predefined portion of said write-available region.

7. A system according to claim 5 wherein said buffer manager is configured to remove said predefined portion of said write-available region of said message buffer to said buffer pool when said write-available region exceeds a predefined size.

8. A system according to claim 5 wherein said buffer manager is configured to remove said predefined portion of said write-available region of said message buffer to said buffer pool when said write-available region exceeds a predefined portion of said message buffer.

* * * * *